Dec. 25, 1951  R. H. LONG  2,580,107
CLUTCH AND THROTTLE CONTROL MECHANISM
Filed July 24, 1946  3 Sheets-Sheet 2

INVENTOR.
RICHARD H. LONG.
BY
H. O. Clayton
ATTORNEY.

Patented Dec. 25, 1951

2,580,107

UNITED STATES PATENT OFFICE 2,580,107

CLUTCH AND THROTTLE CONTROL MECHANISM

Richard H. Long, South Bend, Ind., assignor to Bendix Aviation Corporation, South Bend, Ind., a corporation of Delaware Application July 24, 1946, Serial No. 685,974

10 Claims. (Cl. 192—.07)

1

This invention relates in general to means for controlling the operation of the friction clutch and the throttle of an automotive vehicle and in particular to means for effecting the desired synchronization of said controls in the operation of the power plant of said vehicle.

Yet another object of my invention is to provide, in the power plant of an antomotive vehicle, means for interconnecting the accelerator, the clutch, the throttle and a clutch operating motor said means serving to hold the throttle closed as the motor is operative to disengage the clutch and also serving to insure a synchronized engagement of the clutch and opening of the throttle after the motor is de-energized to permit a re-engagement of the clutch.

A further object of my invention is to provide means for operating the throttle and friction clutch of an automotive vehicle said means being adapted for use with a power means for operating the transmission of said vehicle.

A further object of my invention is to provide a stage type of power means for operating the friction clutch of an automotive vehicle said power means also serving to (1) control the operation of the throttle of said vehicle to insure a closing of the throttle as the clutch is being disengaged by the power means and (2) make possible a synchronized engagement of the clutch and opening of the throttle as the power means is operative to effect an engagement of the clutch.

Another object of my invention is to provide means, preferably comprising a differential pressure motor, for operating the friction clutch of an antomotive vehicle, said power means also serving to control the operation of the engine throttle of said vehicle.

Yet another object of my invention is to provide, in the power plant of an automotive vehicle, a two-stage type of power means for operating the friction clutch of said power plant, said power means also serving to so control the opening of the engine throttle of said power plant that said opening effects, in cooperation with the engagement of the clutch, the desired acceleration of the vehicle.

A further object of my invention is to provide power means, controlled in part by the accelerator of an automotive vehicle and a vehicle speed responsive governor, for effecting a disengagement of the clutch said operation being immediately followed by a re-engagement of the clutch; and this cycle of operation is effected upon releasing the accelerator when the car is travelling below a certain speed; and said power means also serves to control the operation of the throttle of

2 the vehicle to facilitate the operation of the clutch.

Yet another object of my invention is to provide, in the power plant of an automotive vehicle including an engine throttle, a clutch and a change-speed transmission, means for operating the throttle and clutch to facilitate an operation of the transmission, said means serving to maintain the throttle closed as the clutch is being disengaged in preparation for an operation of the transmission and also serving to effect a synchronized opening of the throttle and engagement of the clutch after the accelerator has been depressed to prepare for an opening of said throttle.

Other objects of my invention and desirable details of construction will become apparent from the detailed description of a certain embodiment of the invention described in the specification to follow and disclosed in the accompanying drawings, in which:

Figure 7 is a sectional view disclosing details of one of the motor piston operated switches disclosed in Figure 1; and Figure 8 is a view disclosing details of the check valve incorporated in the end of the clutch control motor.

Figure 1:
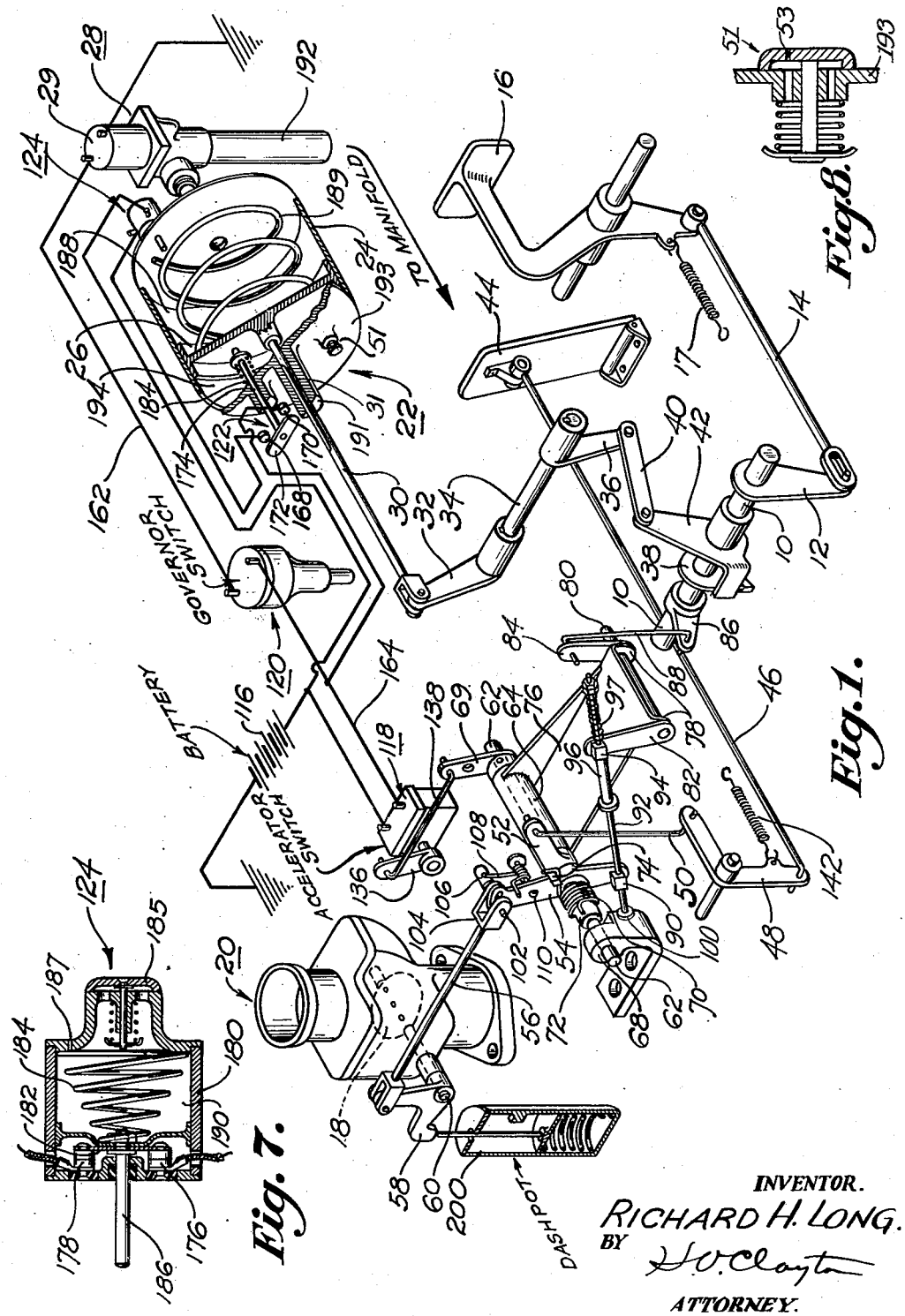
Figure 1 is a diagrammatic view disclosing the principle features of the clutch and throttle operating means constituting my invention.

Referring now to Figure 1 of the drawings disclosing a preferred embodiment of my invention a friction clutch of conventional design, not shown, is operably connected to a clutch throw out shaft 10; and said shaft is operably connected, by a crank 12 and a link 14, to a manually operated clutch pedal 16. The clutch pedal is returned to its clutch disengaged position by a spring 17. My invention is particularly directed to power means for operating the clutch, said power means also serving to control the operation of the throttle valve 18 of the engine carburetor 20. This power means preferably includes a single-acting pressure differential operated two-stage motor 22, comprising a cylinder 24 and a piston 26, the operation of said motor being controlled by the three-way valve, not shown, of a control valve unit 28. This three-way valve, which is operated by a solenoid 29, is a well known type of valve such as that disclosed in Price et al. Patent No. 2,227,274 dated December 31, 1940.

The piston 26 of the clutch operating motor 22 is operably connected to the clutch by means of a rod 30 which is pivotally connected to a crank 32 said crank being keyed to a shaft 34. As is disclosed in Figure 1 the shaft 34 is keyed to a crank 36 which is operably connected to a clutch operating crank 38 by means of a link 40 and a crank 42 rotatably mounted on the shaft 10. The accelerator 44 of the vehicle is operably connected to the aforementioned throttle valve 18 by means of a link 46, a bell crank lever 48, a link 50, a crank 52, a two-armed lever 54, a link 56, a bell crank lever 58 and a shaft 60. The crank 52 is keyed to one end of a rotatable shaft 62 journalled in a bearing 64; and the lever 54 is rotatably mounted on one end of the shaft 62 said shaft being journalled at its other end in a bearing 68. The hub, that is the central portion of the lever 54 is extended laterally to provide a sleeve member 72 rotatably mounted on the shaft 62; and a spring 70, fitted at one of its ends within a slot in the sleeve 72, is coiled around said sleeve, the end of said spring being hooked around a lug 74 extending laterally from one side of the crank 52.

The bearing 64 is mounted at one end of a support 76 which is provided with downwardly extending ears 78 having openings therein to receive a pin 80. A crank 82 is keyed to one end of the pin 80 and a crank 84 is keyed to the other end of said pin; and the latter crank is operably connected to a crank 86 by means of a link 88 said crank 86 being keyed to the clutch operating shaft 10.

Figure 2:
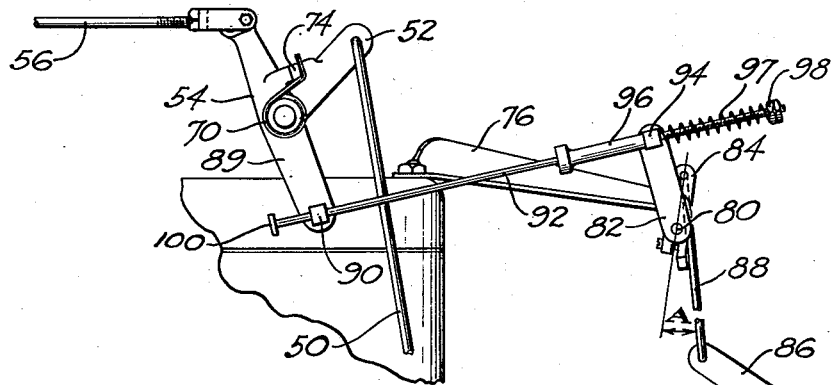
Figure 2 is a view disclosing the principal feature of my invention that is the power operated linkage for controlling the throttle operating connection between the accelerator and throttle.
Figure 3:
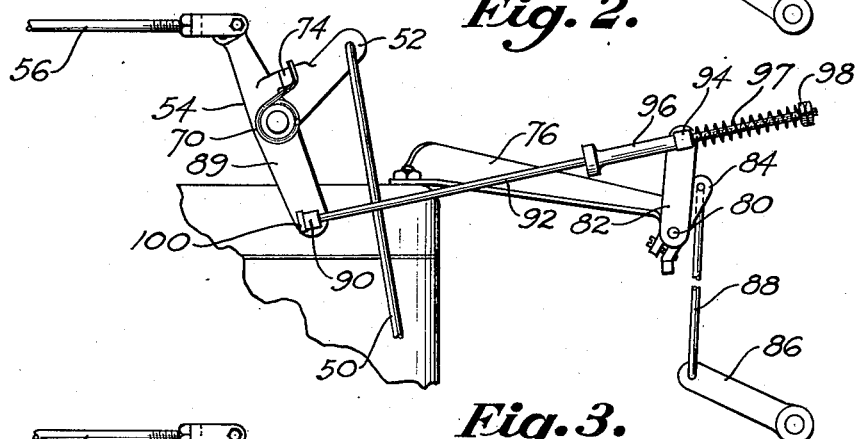
Figures 3 and 4 are views, similar to Figure 2, disclosing different operative positions of the aforementioned power operated linkage.
Figure 4:
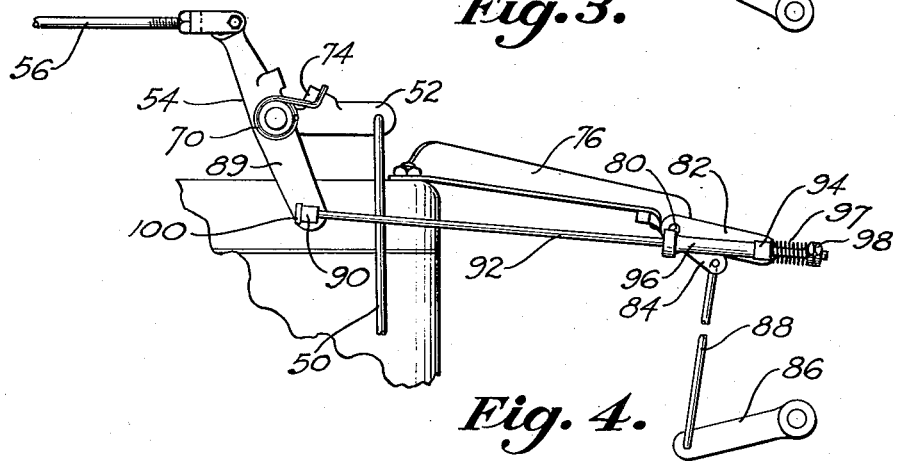

As is disclosed in Figures 2, 3 and 4 the lower arm 89 of the lever 54 is provided with a trunnion pin 90 which is pivotally mounted upon the end of said arm; and within said pin 90 there is slidably mounted a rod 92. A trunnion pin 94, pivotally mounted on the upper end of the crank 82, slidably receives the rod 92 and a bearing member 96 sleeved over the rod 92 is secured to one face of the pin 94. A compression spring 97 is sleeved over one end of the rod 92 said sleeve, at one of its ends, abutting a nut 98 threaded upon the end of the rod 92 and abutting, at its other end, one face of the pin 94; and a stop member 100, secured to one end of the rod 92, completes the description of the principal parts of the control means disclosed in Figures 2, 3 and 4.

Referring to Figure 1 the upper arm of the lever 54 is enlarged and said enlargement is recessed to receive a pin 102 extending therethrough. This pin 102, which is mounted in the furcation of the bifurcated end 104 of the rod 56, is provided with an enlarged portion 106; and said portion serves as a support for one end of spring 108 which is coiled about a pin 110 mounted in and extending laterally from the lever 54. The other end of the spring 108 abuts the edge of the upper arm of the lever 54.

Figure 5:
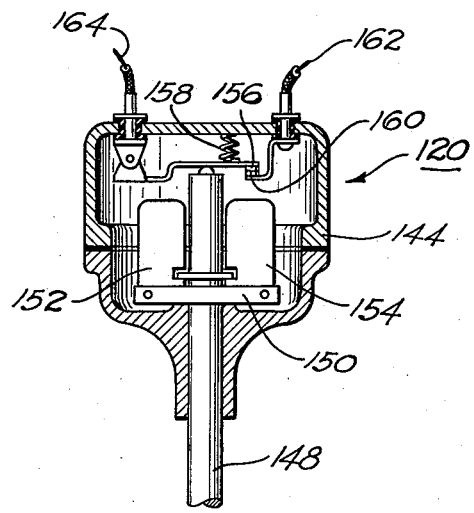
Figure 5 is a sectional view disclosing details of the governor operated switch mechanism of my invention.
Figure 6:
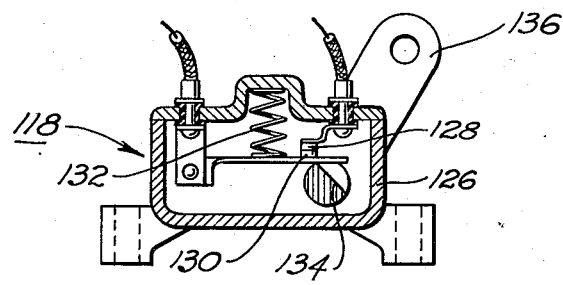
Figure 6 is a sectional view disclosing details of the accelerator operated breaker switch of my invention.

Describing now the electrical means for controlling the operation of the solenoid 29 of the valve unit 28 said means includes a grounded battery 116, an accelerator operated breaker switch 118 disclosed in detail in Figure 6, a vehicle speed responsive governor operated switch 120 disclosed in detail in Figure 5, and breaker switches 122 and 124, Figure 1, operated by the piston 26 of the motor 22. As is disclosed in Figure 1 the accelerator operated switch 118 and the governor operated switch 120 are wired in series with the grounded battery and grounded solenoid; and the breaker switches 122 and 124 are wired in series in a circuit which is in parallel with the accelerator operated switch 118.

Describing now the details of the aforementioned four control switches 118, 120, 122, 124 the switch 118, Figure 6, comprises a casing 126 housing a fixed contact 128 and a movable contact 130. The latter contact is urged away from the fixed contact 128 by a spring 132 and said movable contact is moved into abutment with the fixed contact by means of a cam member 134 which is actuated by a crank 136; and said crank is operably connected to a crank 69 by a link 138. The crank 69 is operably connected to the accelerator operated shaft 62. The above described parts of the switch mechanism are so constructed and arranged and so operative that a release of the accelerator, by the operation of an accelerator return spring 142, serves to close the switch 118.

As to the governor operated switch 120 disclosed in Figure 5 said mechanism comprises a two-part casing 144 housing a centrifugally operated governor mechanism of conventional design. This governor mechanism includes a rotatable drive shaft 148 to which is secured a support bar 150 and centrifugally operated weight members 152 and 154 pivotally mounted upon said bar, serve to bodily move the shaft upwardly at a certain critical R. P. M. of said shaft. At its upper end the shaft 148 abuts a movable switch contact member 156, said member being biased downwardly, by a spring 158, to contact a fixed contact member 160. The latter contact member is wired to the solenoid 29 by a wire 162 and the movable contact member is wired to the accelerator operated switch 118 by a wire 164. The drive shaft 148 is so connected to the propeller shaft of the vehicle that the speed of rotation of said shaft is directly proportional to the speed of the vehicle; and it is accordingly apparent from an inspection of Figure 5 that there is provided a governor operated switch 156, 160 which is closed by the spring 158 below a certain critical vehicle speed and opened by the governor mechanism above a certain critical vehicle speed.

Describing the piston operated breaker switch 122 disclosed in Figure 1 this switch preferably comprises fixed contacts 168 and 170 and a movable contact 172; and said switch is preferably mounted by any suitable support, not shown, adjacent the end of the cylinder 24. A switch operating rod 174 is secured to the movable contact 172 said rod being slidably mounted in one end of said cylinder. Describing the operation of the switch 122, when the motor 22 is vacuum energized, resulting in a movement of the piston 26 to the right, Figure 1, a spring 184 interposed between the flanged end of the rod 174 and the end wall 193 of the motor serves to move said rod to the right thereby closing said switch; and when the return spring 189 within the motor is operative to return the piston 26 to the position disclosed in Figure 1, that is the clutch-engaged position of the piston, the rod 174 is moved to the left by said piston to open the switch 122.

Describing the breaker switch 124 this switch includes fixed contacts 176 and 178 mounted upon and within a switch casing 180 secured to the end wall of the cylinder 24; and a movable contact member 182 of the switch is biased into engagement with said fixed contact by means of a spring 184. A check valve 185 is mounted in the end wall of the casing 180.

As to the operation of the breaker switch 124 during the last increment of clutch disengaging movement of the piston 26 a pin 186 extending from the movable contact 182 is moved to the right, Figure 1, thereby breaking the switch and compressing the spring 184; and this operation of the switch serves to deenergize the solenoid 29 thereby closing the three-way valve. A control compartment 188 of the motor 22 is, by this operation of the control valve, vented to the atmosphere thereby initiating the engagement of the clutch. In this operation a return spring 189 expands, moving the piston 26 to the left, Figure 1, to return it to its clutch engaged position disclosed in said figure; and during this clutch engaging operation of the motor 22 the spring 184 of the switch mechanism 124 serves to return the movable contact 182 to its switch closed position. This operation is, however, delayed by the slow ingress of air into a compartment 190 via a relatively small vent opening 187 in the end wall of the casing 180. There is thus provided means for delaying the closing of the switch 124 until the piston 26 has returned to its clutch engaged position.

There is thus provided, by the electrical means for controlling the operation of solenoid 29, means for initiating a clutch disengaging operation of the motor 22 when the accelerator is released to close the switch 118 and the vehicle is slowed down sufficiently to effect a closing of the governor operated switch 120; and once said operation is initiated its completion is insured despite a depression of the accelerator to open the switch 118; for after the piston 26 is moved a slight distance the switch 122 is closed thereby cooperating with the then closed switch 124 to maintain the solenoid 29 energized. After the disengagement of the clutch is completed its re-engagement is initiated by a depression of the accelerator to open the switch 118; and with the mechanism of my invention if perchance the accelerator should be held depressed to maintain the switch 118 open during the operation of disengaging the clutch, the clutch engaging operation of the motor 22 will nevertheless be initiated after the clutch disengaging operation of said motor has been completed; for as described above when the latter operation has been completed the breaking of the switch 124 will automatically initiate the clutch engaging operation of the motor 22.

Describing now the complete operation of the clutch and throttle operating mechanism constituting my invention it will be assumed that the car equipped with said mechanism is in motion above governor speed, which we shall say is 10 M. P. H. If the accelerator is then released to slow the car down below this critical speed the spring 158 of the governor mechanism, Figure 5, functions to close the switch 120; and when this happens there results an energization of the solenoid 29 to open the three-way valve of the unit 28; for it is to be remembered that the release of the accelerator serves to close the switch 118. The opening of the three-way valve serves to connect the compartment 188 of the motor 22 with a source of vacuum this connection being effected by means of a conduit 192; and this vacuum source is preferably the intake manifold of the internal combustion engine of the vehicle.

The motor 22 is then vacuum energized, the piston 26 being subjected to a differential of pressures to move the same to the right, Figure 1, to disengage the clutch. Describing this operation of the piston the compartment 188 of the motor is partially evacuated by its connection with the source of vacuum and a compartment 194 of said motor is vented to the atmosphere via a check valve 51, Figure 8, in the end plate 193 of the cylinder 24. As described above the first increment of movement of the piston 26 serves to close the switch 122; and this movement of the piston also serves to take up the lost motion between the stop 100 and the trunnion pin 90, Figure 2. In this operation the rod 92 is moved from its clutch engaged position disclosed in Figure 2 to that disclosed in Figure 3 of the drawings; and in the latter position the clutch plates are either just barely separated one from the other or are just about to be separated. This lost motion makes possible the hereinafter described controlled throttle opening movement of the lever 54 in relation to the movement of the piston 26 as the clutch plates are being engaged; and this is an important feature of my invention. Continued clutch disengaging movement of the piston 26 serves to further separate the clutch plates one from another and during this operation the spring 97 is compressed to the position disclosed in Figure 4.

As explained above when the motor 22 has completed its operation of disengaging the clutch the piston 26 is located at the right end of the cylinder 24 and the switch 124 is then broken to make possible a clutch engaging operation of said motor provided, of course, the accelerator is at the time depressed to break the switch 118. Now it is to be particularly noted at this juncture that during the above described clutch disengaging operation of the motor 22 it is impossible to open the throttle; for at this time the stop member 100 prevents any clockwise rotation of the lever 54. If the accelerator is depressed at this time the spring 70, which is weaker than the spring 97, will yield, the parts then assuming the relative positions disclosed in Figure 4.

Describing now the clutch engaging operation of the motor 22, which operation may, of course, be effected either to get the car under way after a complete stop of the vehicle or with the vehicle in motion to accelerate the car after an operation of the transmission, when the solenoid 29 is deenergized the compartment 188 of said motor is vented to the atmosphere via the three-way control valve of the unit 28; and when this occurs the spring 189 expands to make possible the clutch engaging operation of the springs of the clutch, not shown. During the first stage of this clutch engaging operation of the motor 22 the spring 97, Figures 1 to 3, expands and this operation is relatively quickly completed just as the clutch plate comes into contact with each other or if desired just short of their contact with each other. In this operation the motor controlled force transmitting means operating the stop 100 moves from the position shown in Figure 4 to that shown in Figure 3. During the second stage of clutch engaging operation of the motor 22 the crank 86 moves from the position disclosed in full lines in Figure 3 to the position disclosed in full lines in Figure 2 and during this operation the lever 54 is moved clockwise to open the throttle said operation of the lever 54 being effected by the spring 76 which is at the time loaded by the operation of the accelerator. Now it is to be particularly noted that in this second stage operation of the motor 22 the clutch operated throttle control linkage 86, 88, 84, 82, 92 etc., serves to effect the desired rate of opening of the throttle as the piston is moving to effect a loading of the clutch plates; and these parts are so constructed and arranged and so operative that there is effected a smooth operation of the vehicle, that is the desired acceleration of the vehicle. Describing the stage clutch engaging operation of the motor 22, the check valve 51 will permit an uninterrupted clutch disengaging movement of the piston to the right, Figure 1, and a bleed opening 53 in said valve will effect a controlled second stage clutch engaging movement of said piston. The relatively rapid first stage of clutch engaging movement of the piston may be effected by the incorporation of a slot 31 in the rod 30 said slot registering with a hub portion 191 of the end plate 193 of the motor 22. In this second stage clutch engaging operation of the motor 22 the angle A, Figure 2, between the crank 84 and the link 88 is progressively decreased. Now it is to be repeated that during this clutch engaging operation of the motor 22 the mode of opening of the throttle is determined by the operation of the stop means 100; and this operation is determined by the construction and setting of the links and levers 82, 84, 86, 88 etc.

After the clutch is completely engaged the clockwise rotation of the lever 54 may be continued to increase the degree of opening of the throttle; and the lost motion between the trunnion pin 90 and the stop 100 is such as to permit this operation. A subsequent complete release of the accelerator below governor speed serves, of course, to repeat the above described clutch disengaging operation of the motor 22.

Describing the throttle closing operation of the linkage interconnecting the throttle and the accelerator, said linkage being disclosed and claimed in my copending application 668,971 filed May 10, 1946, when the driver removes his foot from or relieves the pressure upon the accelerator the spring 142 serves to rotate the lever 48 thereby effecting a closing of the switch 118 and a rotation of the lever 58 to close the throttle valve 18. In this operation the switch 118 is closed just before the throttle is closed and continued movement of the force transmitting linkage serves to close the throttle. A dashpot 200 is operably connected to the throttle operating lever 58, said dashpot serving to effect a slow that is cushioned closing of the throttle. The final increment of movement of the lever 48 serves to rotate the lever 54 until the pin 102 is seated in the right end, Figure 1, of the slot in the upper end of said lever, all as is disclosed in Figure 1.

There is thus provided, in the power plant of an automotive vehicle, a manually and power operated clutch and throttle operating mechanism operable to effect a synchronized operation of said controls to insure the desired acceleration of the vehicle; and this operation may be effected after an operation of the change-speed transmission to shift the gears of said transmission. In other words the mechanism of my invention may be incorporated in a power plant including power means for automatically operating the transmission immediately after the clutch is disengaged by said mechanism; and such a mechanism is disclosed in my aforementioned application No. 668,971.

With the mechanism of my invention the throttle may not be opened once the operation of the motor 22 is initiated to disengage the clutch; and a depression of the accelerator during said operation will not prevent its completion; in fact after said clutch disengaging operation is completed, the accelerator being at the time depressed, the mechanism is automatically operative to re-engage the clutch said latter operation being synchronized with an opening of the throttle, all as is described above.

I claim:

1. In an automotive vehicle provided with an engine throttle, an accelerator for operating the throttle, and a friction clutch; means operative to prevent an opening of the said throttle when the clutch is being disengaged and also operative to synchronize the opening of the throttle with the engagement of the clutch, said means comprising force transmitting means interconnecting the throttle and accelerator, a two-stage pressure differential operated motor for operating the clutch, and stop means, including yieldable means, connected with the power element of said motor, said stop means being so connected with the force transmitting means that it serves to prevent a throttle opening movement of the force transmitting means when the motor is operating to disengage the clutch and also serves to control the operation of said force transmitting means to effect the aforementioned synchronization after the motor is de-energized and during the second stage of clutch engaging operation of the motor.

2. In an automotive vehicle provided with a throttle, an accelerator, a vehicle speed responsive governor and a clutch, manually operated means for operating the throttle, and power means, including a pressure differential operated motor, for operating the clutch and for controlling the operation of the manually operated throttle operating means, said power means being controlled in part by the accelerator and governor and being operative to automatically effect a disengagement of the clutch and a reengagement thereof in one cycle of operations and to control the mode of operation of the throttle during said operations.

3. In an automotive vehicle provided with a throttle, a throttle operating accelerator, a vehicle speed responsive governor and a friction clutch, force transmitting means interconnecting the throttle and accelerator, and power means operative to disengage the clutch, control the engagement thereof and control the throttle opening movement of a part of the force transmitting means, said power means comprising a single acting pressure differential operated motor operably connected to the clutch and further comprising means for controlling the operation of said motor including a three-way valve, a solenoid for operating said valve, and means for controlling the operation of said solenoid including an accelerator operated switch and a governor operated switch wired in series with the accelerator operated switch, said switches serving when closed to complete an electrical circuit to said solenoid.

4. In an automotive vehicle provided with a throttle, a throttle operating accelerator, a vehicle speed responsive governor and a friction clutch, force transmitting means, including yieldable means operative when tensioned by a depression of the accelerator to bias the throttle toward its open position, interconnecting the throttle and accelerator, and power means operative to disengage the clutch, control the engagement thereof and control the throttle opening movement of a part of the force transmitting means, said power means comprising a single acting pressure differential operated motor operably connected to the clutch and further comprising means for controlling the operation of said motor including a three-way valve, a solenoid for operating said motor valve, and means for controlling the operation of said solenoid including an accelerator operated switch, and a governor operated switch wired in series with the accelerator operated switch, said switches serving when closed to complete an electrical circuit to said solenoid.

5. In an automotive vehicle provided with a throttle, a throttle operating accelerator and a friction clutch including a clutch engaging spring means; throttle operating force transmitting means interconnecting the accelerator and throttle, said means including yieldable means operative to subject a part of the force transmitting means to a load tending to open the throttle when the accelerator is depressed to tension said yieldable means; power means for effecting a disengagement of the clutch, for controlling the clutch engaging operation of the clutch engaging spring means and for controlling the operation of the aforementioned throttle operating force transmitting means, said power means including a pressure differential operated motor comprising a cylinder and a piston, force transmitting means, including stop means, interconnecting the piston and a part of the throttle operating force transmitting means and operative, by virtue of the angular movement of certain of its parts, to control the rate of movement of the throttle operating means as the piston is moving to effect an engagement of the clutch, said throttle operating means being then actuated by the aforementioned accelerator operated yieldable means.

6. In an automotive vehicle provided with a throttle, a throttle operating accelerator, a vehicle speed responsive governor, and a friction clutch including a clutch engaging spring means; throttle operating force transmitting means interconnecting the accelerator and throttle, said means including yieldable means operative to subject a part of the force transmitting means to a load tending to open the throttle when the accelerator is depressed to tension said yieldagble means; power means for effecting a disengagement of the clutch, for controlling the clutch engaging operation of the clutch engaging spring means and for controlling the operation of the aforementioned throttle operating force transmitting means, said power means including a pressure differential operated motor comprising a cylinder and a piston and further including means for controlling the operation of said motor comprising an accelerator operated switch and a governor operated switch, force transmitting means, including stop means, interconnecting the piston and a part of the throttle operating force transmitting means and operative, by virtue of the angular movement of certain of its parts, to control the rate of movement of the throttle operating means as the piston is moving to effect an engagement of the clutch, said throttle operating means being then actuated by the aforementioned accelerator operated yieldable means.

7. In an automotive vehicle provided with an accelerator, a throttle, a vehicle speed responsive governor and a friction clutch; manually and power operated means for operating the clutch and for controlling the operation of the throttle as the clutch is being operated said means including force transmitting means interconnecting the accelerator and throttle, a pressure differential operated motor operably connected to the clutch, means, including an accelerator operated switch, a governor operated switch and switch means for insuring the completion of the cycle of operations of the motor once initiated, for controlling the operation of said motor, and means interconnecting the power element of said motor with a part of the aforementioned throttle operating means and operative to maintain a part of the force transmitting means in a position to hold the throttle closed when the motor is operating to disengage the clutch and also operative to permit a controlled throttle operating movement of the latter force transmitting means when the motor is operating to effect an engage- of the clutch.

8. In an automotive vehicle provided with a friction clutch, an accelerator, a vehicle speed responsive governor and a throttle valve; manually and power operated means for operating said throttle valve and clutch including force transmitting means interconnecting the throttle valve and accelerator, a pressure differential operated motor operably connected to the clutch, valve means for controlling the operation of said motor, electrical means, including an accelerator operated switch, a switch operated by the governor and switch mechanism operated by the power element of the motor, for controlling the operation of the valve means, and means connected with the power element of the motor for controlling the throttle operating movement of a part of the aforementioned force transmitting means; the parts of the aforementioned mechanism being so constructed and arranged and so operative that the throttle is held closed when the motor is operating to disengage the clutch and the opening of the throttle and the engagement of the clutch are synchronized after the motor is de-energized to permit a re-engagement of the clutch.

9. In an automotive vehicle provided with a power plant comprising an engine throttle, a change-speed transmission, a throttle operating accelerator and a friction clutch including clutch plates and clutch operating yieldable means; means for operating the clutch and throttle to facilitate an operation of the transmission, said means comprising force transmitting means interconnecting the accelerator and throttle, a pressure differential operated motor, means, including an accelerator operated switch, for controlling the operation of said motor, and force transmitting means, including stop means, interconnecting the power element of said motor, the clutch and the aforementioned force transmitting means, said stop means serving, by virtue of its rate of movement, to control the rate of throttle opening movement of said first mentioned force transmitting means as the clutch operating yieldable means is operating to progressively increase the loading of the clutch plates.

10. In an automotive vehicle provided with an internal combustion engine controlling throttle, a friction clutch having driving and driven elements, a vehicle speed responsive governor, and an accelerator; force transmitting means interconnecting the accelertor and throttle, a pressure differential operated motor for disengaging the clutch, means, including an accelerator operated switch, a governor operated switch and other switch means, for controlling the operation of said motor to successively effect a disengagement of the clutch and permit a re-engagement thereof said cycle of operations being initiated by a release of the accelerator and a slowing down of the vehicle to a certain speed and being completed by a depression of the accelerator; and stop means operably connected to the power element of said motor and to the aforementioned force transmitting means said stop means serving, when the power element is moving during the engagement of the clutch, to control the mode of throttle opening movement of said force transmitting means and also serving, when the motor is operating to effect a disengagement of the clutch, to maintain the throttle operating force transmitting means in its throttle closed position.

RICHARD H. LONG.

REFERENCES CITED

The following references are of record in the file of this patent:

UNITED STATES PATENTS

| Number | Name | Date |
|---|---|---|
| 1,911,599 | Bloxsom | May 30, 1933 |
| 2,062,104 | Prince | Nov. 24, 1936 |
| 2,229,055 | Dick | Jan. 21, 1941 |
| 2,346,149 | Brewer | Apr. 11, 1944 |